(12) United States Patent
McKeown et al.

(10) Patent No.: US 12,703,513 B2
(45) Date of Patent: Aug. 11, 2026

(54) DEVICE AND SYSTEM FOR INSPECTING AIRCRAFT PRIOR TO TAKEOFF

(71) Applicants: Eagle Aerospace Ltd., Campbellford (CA); JCAI Inc., Cambridge (CA)

(72) Inventors: Stephen Lyle McKeown, Campbellford (CA); Jeffery Paul Campbell, Cambridge (CA); Kelvin Williamson, Cambridge (CA); Linda Cato, Campbellford (CA)

(73) Assignees: EAGLE AEROSPACE LTD., Campbellford (CA); JCAI INC., Cambridge (CA)

( * ) Notice: Subject to any disclaimer, the term of this patent is extended or adjusted under 35 U.S.C. 154(b) by 0 days.

(21) Appl. No.: 18/841,383

(22) PCT Filed: Feb. 27, 2023

(86) PCT No.: PCT/CA2023/050245
§ 371 (c)(1),
(2) Date: Aug. 25, 2024

(87) PCT Pub. No.: WO2023/159323
PCT Pub. Date: Aug. 31, 2023

(65) Prior Publication Data

US 2025/0178752 A1 Jun. 5, 2025

Related U.S. Application Data

(60) Provisional application No. 63/268,522, filed on Feb. 25, 2022.

(51) Int. Cl.
*B64F 5/60* (2017.01)
*H04N 7/18* (2006.01)
*H04N 23/11* (2023.01)

(52) U.S. Cl.
CPC ............... *B64F 5/60* (2017.01); *H04N 7/181* (2013.01); *H04N 23/11* (2023.01)

(58) Field of Classification Search
CPC ........... B64F 5/60; B64U 10/13; B64U 10/60; B64U 80/86; B64U 2101/26;
(Continued)

(56) References Cited

U.S. PATENT DOCUMENTS 9,414,026 B2 * 8/2016 Blanchard ............ G01M 5/005
11,079,760 B2 8/2021 Hafenrichter et al.
(Continued)

OTHER PUBLICATIONS

International Search Report and Written Opinion dated May 30, 2023 in International Application No. PCT/CA2023/050245.

*Primary Examiner* — Thai Q Tran
*Assistant Examiner* — Stephen R Smith
(74) *Attorney, Agent, or Firm* — Wentsler LLC

(57) ABSTRACT

A system for inspecting surfaces of an aircraft prior to takeoff. The system includes a device movable relative to the surfaces of the aircraft. At least one camera on the device is provided for determining conditions of the surfaces of the aircraft. The at least one camera is configured to provide images indicative of the presence or absence of contaminates and/or fluid failure on the critical surfaces of the aircraft. A control module is provided for receiving the images from the at least one camera. The control module is programmed to determine, based on the images from the at least one camera, a status of the surfaces of the aircraft and to communicate that status to an external location.

19 Claims, 7 Drawing Sheets

(58) Field of Classification Search

CPC .... B64U 2101/30; H04N 7/181; H04N 23/11; G01N 21/9515; G01N 2021/9518; G01N 21/94

USPC .......... 348/128; 702/59; 244/17.11; 701/33.2

See application file for complete search history.

(56) References Cited

U.S. PATENT DOCUMENTS

| | | | | |
|---|---|---|---|---|
| 2013/0134254 | A1* | 5/2013 | Moore | B64U 10/60 244/17.11 |
| 2016/0114907 | A1* | 4/2016 | Schwartz | G07C 5/0808 701/33.2 |
| 2017/0115667 | A1* | 4/2017 | Marr | G08G 5/76 |
| 2018/0321386 | A1* | 11/2018 | Bosetti | G01S 17/95 |
| 2018/0348760 | A1* | 12/2018 | Peverill | G01R 33/02 |
| 2019/0185186 | A1* | 6/2019 | Li | G06V 10/32 |
| 2019/0238762 | A1* | 8/2019 | Coppock | G06T 7/0004 |
| 2019/0256226 | A1* | 8/2019 | Shapoury | G06T 7/73 |
| 2019/0283869 | A1* | 9/2019 | Broberg | H02G 11/02 |
| 2021/0129983 | A1* | 5/2021 | Ratti | B64B 1/58 |
| 2024/0327042 | A1* | 10/2024 | Foong | B64U 10/13 |
| 2025/0178752 | A1* | 6/2025 | McKeown | G01N 21/9515 |

* cited by examiner

DEVICE AND SYSTEM FOR INSPECTING AIRCRAFT PRIOR TO TAKEOFF

PRIORITY

This application is the National Stage under 35 U.S.C. § 371 of International Application No. PCT/CA2023/050245, filed Feb. 27, 2023, which claims the benefit of priority of U.S. provisional patent application Ser. No. 63/268,522, filed Feb. 25, 2022, the contents of which are incorporated herein by reference in their entirety.

FIELD

The subject application relates to, in general, a method and system for informing airplane pilots and aviation stakeholders regarding Fluid Failure (FF) and/or surface contaminates prior to takeoff.

BACKGROUND

For civilian aircraft, the Pilot-in-Command is responsible for ensuring that some of his or her aircraft's critical surfaces (i.e., including, but not limited to, wings, control surfaces, rotors, propellers, upper surface of the fuselage on aircraft that have rear-mounted engines, horizontal stabilizers, vertical stabilizers, or any other stabilizing surface of an aircraft) are free of frozen contaminates. Contaminates may include, but not be limited to, snow, ice, slush, frost, etc. The term "fluid failure" is reference to SAE Standard AS6285E which states that "[t]he applied anti-icing fluid shall remain in a liquid state and shall show no indication of failure (e.g., color change to white, a loss of gloss, or the presence of ice crystals in the fluid film)."

Holdover time (HOT) guidelines are provided to assist pilots and flight crews in making decisions regarding de-icing and anti-icing of an aircraft. Hold over time is the time that the anti-icing fluid remains effective and is measured from the time the anti-icing fluid is applied on a clean wing until the time that ice crystals or snow remain on the surface and create surface roughness. Tables have been created by regulators that provide estimated holdover times for a range of conditions. Unfortunately, in some cases, such as, mixed phase precipitation, moderate and heavy freezing rain or heavy snow, the regulators have not provided any guidelines for HOT.

For cases where there are no HOT guidelines, or in instances where operators choose not to use HOT guidelines, pilots are required to carry out a pre-take-off contamination inspection. To be most effective this inspection should be conducted from outside the aircraft in order to see all of the critical surfaces. However, this tends to introduce a considerable delay in the departure of the aircraft. If the holdover time is exceeded, take-off can only occur if a pre-take-off inspection is carried out or if the aircraft is de-iced/anti-iced again.

It is difficult to be precisely determine HOT because it depends on variables, such as precipitation type, intensity, temperature, wind, humidity, as well as aircraft type and configuration. It is desirable to have a method to detect fluid failure and/or non-failure prior to takeoff as a way of improving safety over the use of tables alone.

SUMMARY OF THE INVENTION

There is provided a system for inspecting surfaces of an aircraft prior to takeoff. The system includes a device movable relative to the surfaces of the aircraft. At least one camera on the device is provided for determining conditions of the surfaces of the aircraft. The at least one camera is configured to provide images indicative of a presence or absence of a contaminate and/or fluid failure on the surfaces of the aircraft. A control module is provided for receiving the images from the at least one camera. The control module is programmed to determine, based on the images from the at least one camera, a status of the surfaces of the aircraft and to communicate that status to an external location.

In the foregoing system, the status is provided via a text or image.

In the foregoing system, the status is relayed to one or more of the following: a pilot-in-charge, a dispatcher or another stakeholder.

In the foregoing system, the device is an unmanned aerial vehicle.

In the foregoing system, the device is an unmanned aerial vehicle secured by a tether to a ground vehicle.

In the foregoing system, the tether includes a plurality of cables for providing electrical power to the unmanned aerial vehicle and communication between the unmanned aerial vehicle and the ground vehicle.

In the foregoing system, there is provided an enclosure in the ground vehicle for storing the unmanned aerial vehicle.

In the foregoing system, the control module is disposed in the enclosure.

In the foregoing system, the device is attached to a moveable boom that is configured to move the device relative to the surface of the aircraft.

In the foregoing system, the moveable boom is collapsible for storage below ground level.

In the foregoing system, the at least one camera is a short-wave infrared camera or a visible light camera.

In the foregoing system, the device including two cameras wherein a first camera is a short-wave infrared camera and a second camera is a visible light camera.

In the foregoing system, the device further includes a plurality of sensors. The plurality of sensors including one or more of the following: position sensors, obstacle avoidance sensors, light detection and ranging (LiDAR) sensors or light sensors.

In the foregoing system, the control module includes a convolutional neural network.

In the foregoing system, the control module is programmed to: receive images of the surfaces from the at least one camera; determine the presence or absence of a contaminate and/or fluid failure on the surfaces based on the images received from the at least one camera; and provide an indication to an operator of the presence of fluid on the surfaces.

There is also provided a system for inspecting surfaces of an aircraft prior to takeoff. The system includes a device movable relative to the surfaces of the aircraft. A first camera on the device is provided for determining conditions of the surfaces of the aircraft. The first camera is a short-wave infrared camera configured to detect light reflected from the surfaces of the aircraft that is in the short-wave infrared range and to provide a signal indicative of the light reflected from the surfaces. A second camera on the device is provided for determining conditions of the surfaces of the aircraft. The second camera is a visible light camera configured to detect variations in an appearance of the surfaces of the aircraft and to provide a signal indicative of the appearance of the surfaces. A control module receives the signals from the first and second cameras. The control module is programmed to determine, based on the signals from the first and second cameras a condition of the surfaces of the aircraft and to communicate that condition to an external location.

In the foregoing system, the external location is a computer screen accessible to a pilot of the aircraft.

In the foregoing system, the external location is a computer screen accessible to airport personnel remote from the aircraft.

In the foregoing system, the control module is configured to generate a composite image overlaying the signals from the first and second cameras onto an image of the aircraft.

In the foregoing system, the control module includes a convolutional neural network configured to analyze the composite image to determine a presence or absence of contaminates and/or fluid failure on the critical surfaces of the aircraft.

In the foregoing system, the control module includes an aircraft critical surface detection neural controller for detecting and isolating critical surfaces of the aircraft.

There is also provided a method for inspecting surfaces of an aircraft prior to takeoff and determining the presence or absence of a contaminate and/or fluid failure on critical surfaces of the aircraft. The method includes the steps of: successively positioning a device adjacent a plurality of surfaces of the aircraft, the device comprising a first camera for determining conditions of the surfaces of the aircraft, the first camera being a short-wave infrared camera configured to detect light reflected from the surfaces of the aircraft that is in the short-wave infrared range and to provide a signal indicative of the light reflected from the surfaces and a second camera for determining conditions of the surfaces of the aircraft, the second camera being a visible light camera configured to detect variations in an appearance of the surfaces of the aircraft and to provide a signal indicative of the appearance of the surfaces; segmenting the surfaces in the images provided by the first and second cameras to determine critical surfaces of the aircraft; and analyzing the critical surfaces based on the images provided by the first and second cameras to determine the presence or absence of contaminates and/or fluid failure.

DETAILED DESCRIPTION

The following presents a description of the disclosure; however, aspects may be embodied in many different forms and should not be construed as limited to the embodiments set forth herein. Furthermore, the following examples may be provided alone or in combination with one or any combination of the examples discussed herein. Directional references such as “left” and “right” are for ease of reference to the figures.

Figure 1:
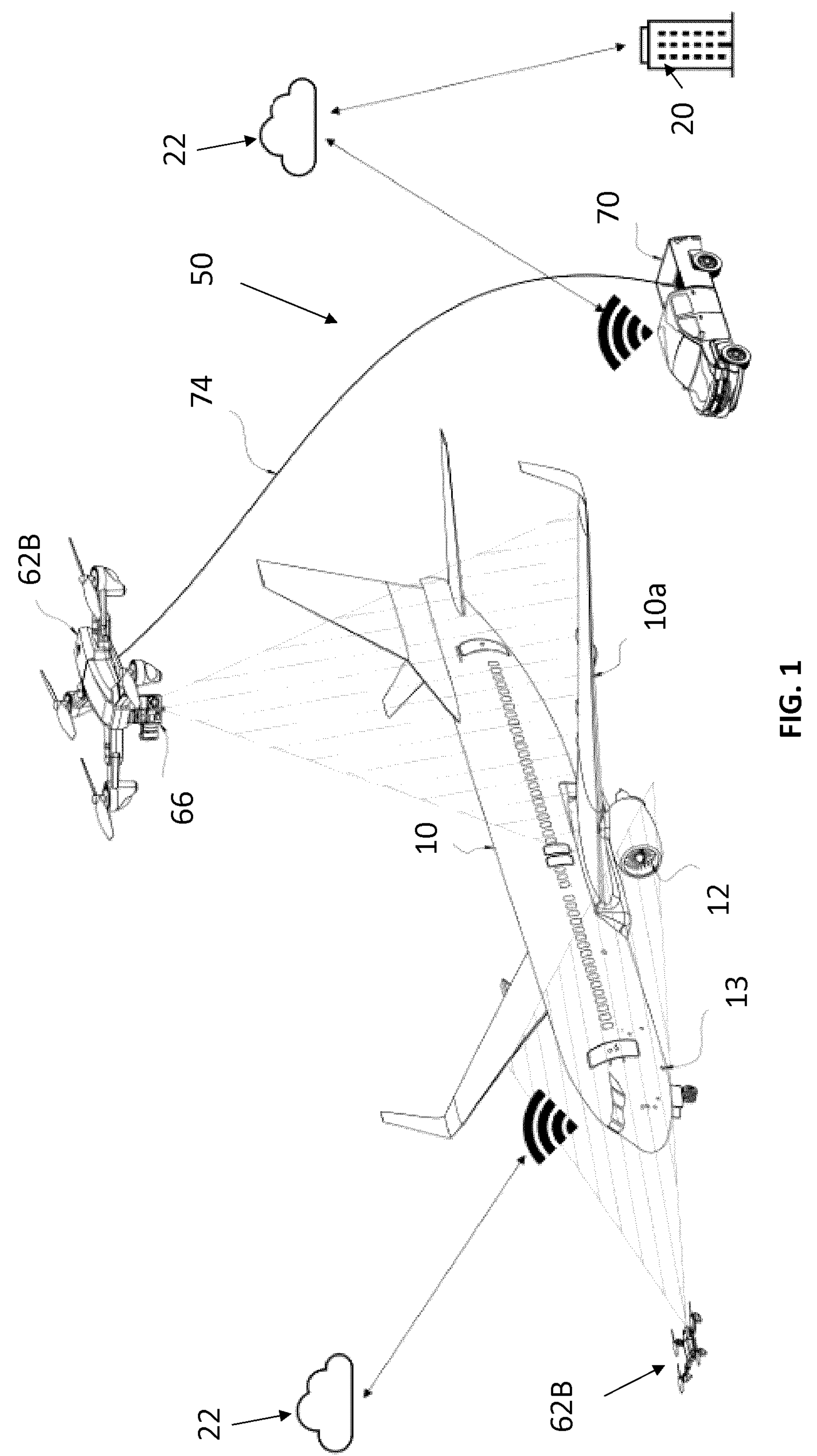
FIG. 1 illustrates an aircraft pre-takeoff inspection system.
Figure 4:
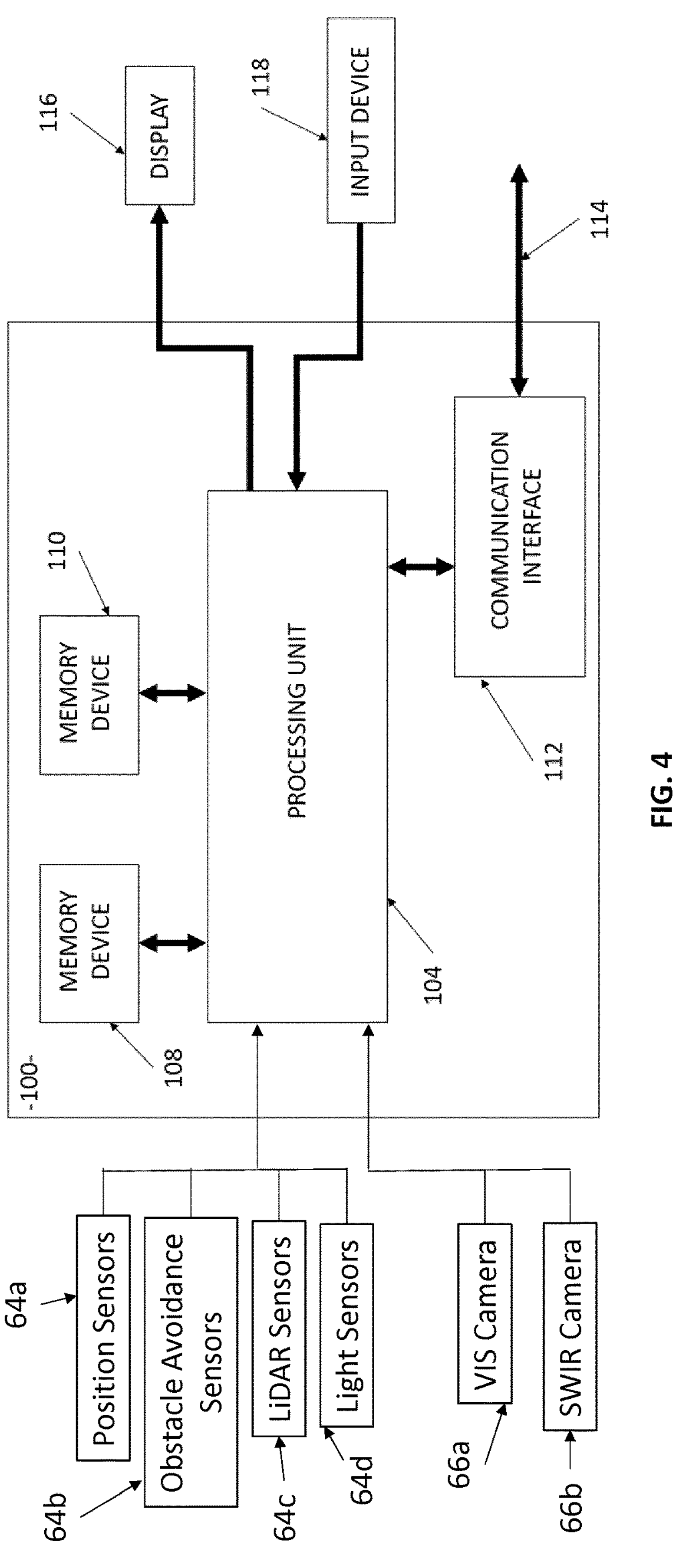
FIG. 4 is a schematic of a control module for the system of FIG. 1.

Referring now to the drawings, FIG. 1 illustrates a pre-takeoff inspection system 50 positioned adjacent an aircraft 10 to examine surfaces 10*a* of the aircraft 10, as described in detail below. The system 50, in general, includes one or more inspection devices and a control module 100 (FIG. 4). In the embodiment illustrated in FIG. 1, the inspection devices are unmanned aerial vehicles (UAV) 62A, 62B. The UAV 62A is configured to move freely about the aircraft 10 whereas the UAV 62B is tethered to a ground vehicle 70.

Figure 2B:
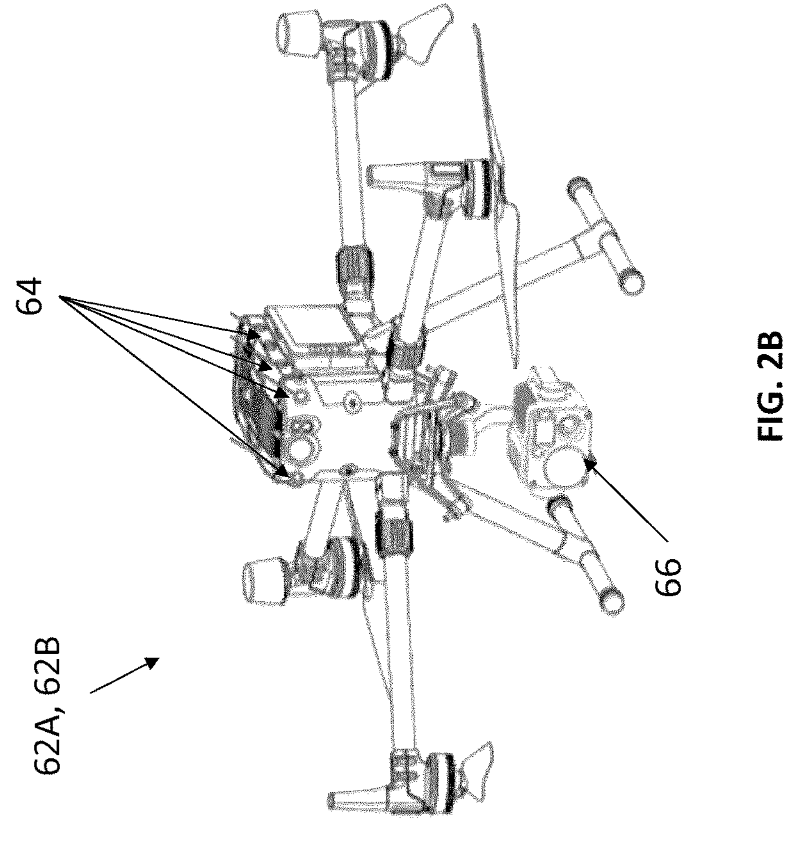
FIG. 2B is a top perspective view of the unmanned aerial vehicle (UVA) of FIG. 2A.
Figure 2A:
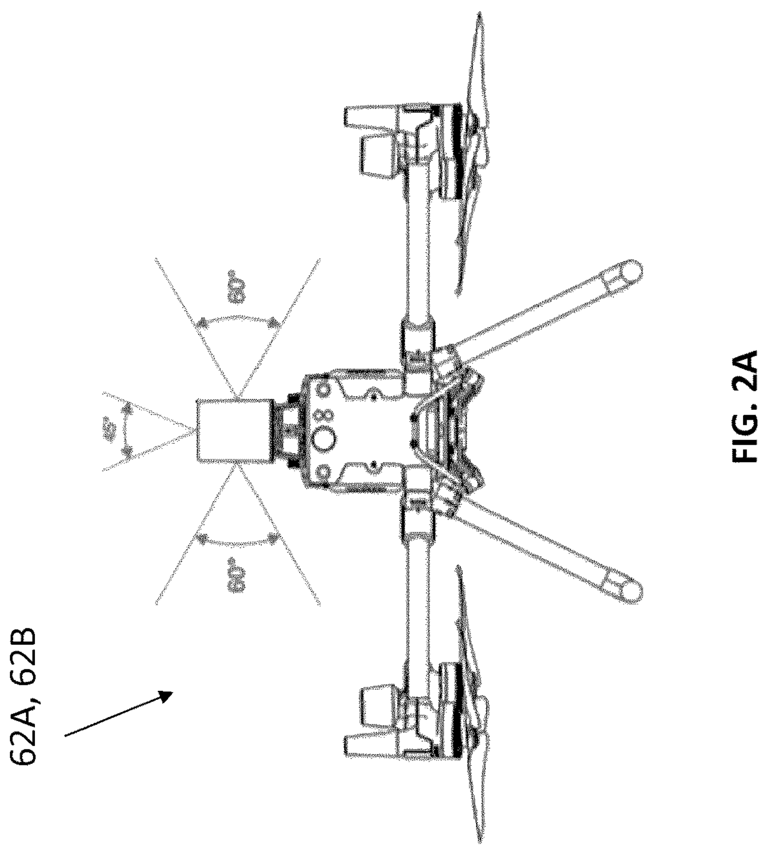
FIG. 2A is a front view of an unmanned aerial vehicle (UVA) of the system of FIG. 1.

Referring to FIGS. 2A and 2B, the UAV 62A, 62B includes a plurality of sensors 64. Referring now to FIG. 4, it is contemplated that the plurality of sensors 64 may include position sensors 64*a*, obstacle avoidance sensors 64*b*, Light Detection and Ranging (LiDAR) sensors 64*c*, light sensors 64*d*, etc. The UAV 62A, 62B may also include cameras 66

The position sensors 64*a* may be configured to provide real-time location data, e.g., latitude, longitude, elevation etc. for the UAV 62A, 62B. It is contemplated that such position sensors 64*a* may be configured to provide signals indicative of the three-dimensional positioning of the UAV 62A, 62B from a global positioning system (GPS), etc.

The UAV 62A, 62B may be equipped with obstacle avoidance sensors 64*b* providing six directions of obstacle avoidance (three of the six directions are illustrated in FIG. 2A). It is contemplated that these sensors 64*b*, in conjunction with the control module 100 (discussed in detail below) may detect objects in the UAV’s 62A, 62B path and adjust the flight path of the UAV 62A, 62B dynamically to avoid collisions. These sensors 64*b* would provide additional safety to prevent collisions with the aircraft 10 being inspected as well as other aircraft (not shown) or vehicles (not shown) in the vicinity.

The Light Detection and Ranging (LiDAR) sensor(s) 64*c* may be used to create a detailed representation of the aircraft 10 being inspected and aid in detecting critical surfaces 10*a* to be captured by the cameras 66. The UAV 62A, 62B may also be equipped with spotlights (not shown) that may be used to enhance operation in low light conditions. It is also contemplated that the UAV 62A, 62B may be equipped with a light sensor 64*d*, that would provide a signal indicative of the level of illumination of the surface 10*a*. Based on the signal from the light sensor 64*d*, the control module 100 may programmed to determine which of the cameras 66 are required to capture images of the critical surface 10*a* of the aircraft 10. The control module 100 may also use the signal from the light sensor 64*d* to determine that additional illumination is necessary to provide a proper analysis of the surface 10*a*.

The cameras 66 may be used to obtain images of the surface 10*a* of the aircraft 10. The cameras 66 may a high-resolution visible light (VIS) camera 66*a*, a short-wave infrared (SWIR) camera 66*b*, or other night vision cameras. The VIS and SWIR cameras 66*a*, 66*b* may be used to obtain images of critical surfaces 10*a* of the aircraft 10 in order to detect contaminated surfaces, or surfaces where there has been fluid failure. The VIS camera 66*a* may be configured to detect the texture of the surface 10*a*. The texture of a dry surface 10*a* may have a shiny metallic appearance whereas the surface 10*a* coated with ice may have a more mat appearance. The VIS camera 66*a* may be configured to provide images that distinguish between shiny and mat appearances.

The SWIR camera 66$b$ uses a portion of the electromagnetic spectrum that is not visible to the human eye (ranging between 0.9 and 1.7 microns). The SWIR camera 66$b$ can detect and capture surfaces in very low light conditions, making use of natural or artificial sources of SWIR radiation such as moon or starlight, or SWIR illumination lamps. The SWIR camera 66$b$ detects light that is reflected from the surface 10$a$. Certain wavelengths in the SWIR range are absorbed by ice or other contaminates on the surface 10$a$ and thus will be missing in reflected light. Thus, when the reflected lights are captured by the SWIR camera 66$b$, the resulting image will be significantly different from a dry surface 10$a$, thereby aiding in the detecting of ice (or other contaminates) on the surface 10$a$.

Figure 3:
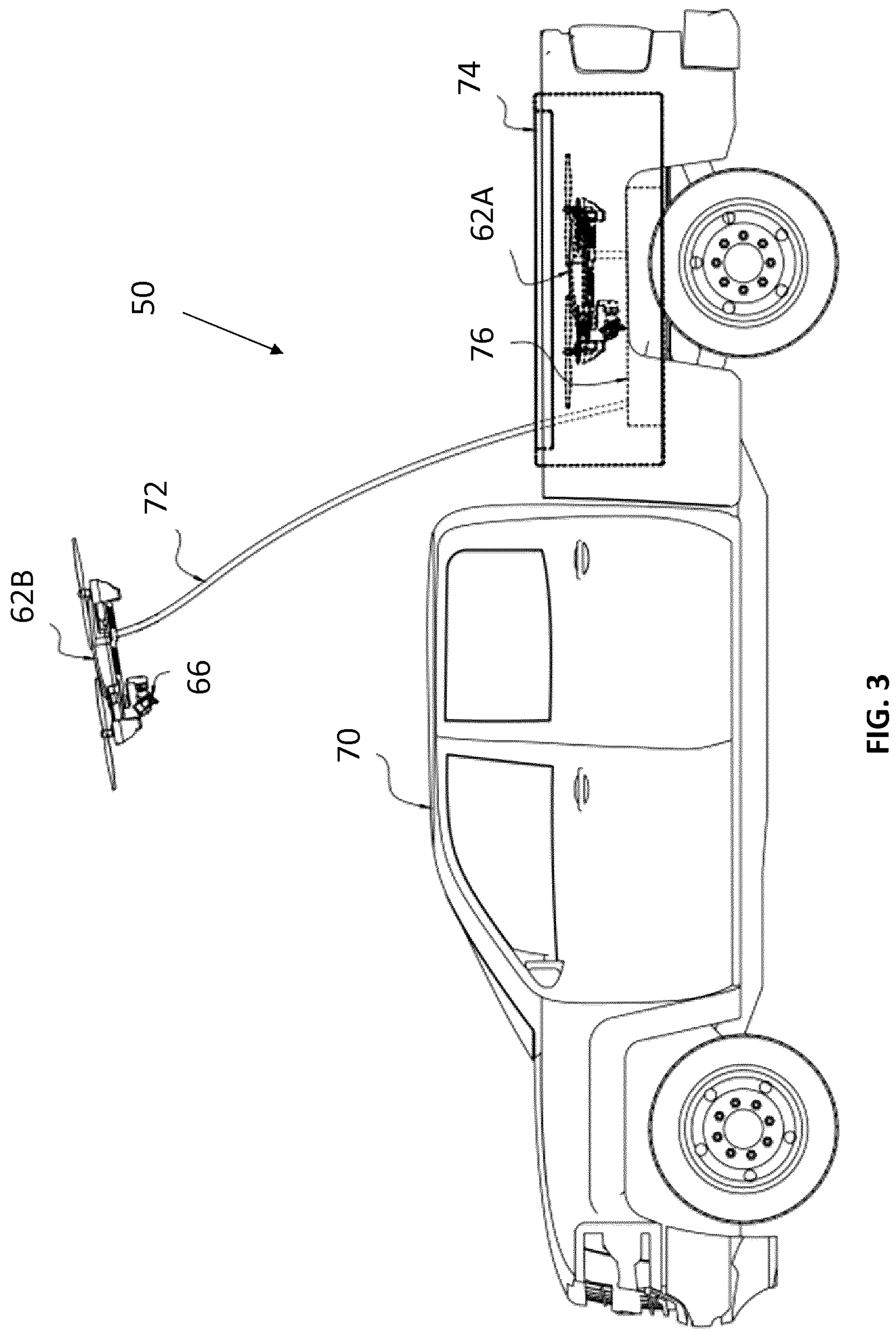
FIG. 3 illustrates a pre-takeoff inspection system including a vehicle mounted unmanned aerial vehicle (UAV)

As noted above, FIG. 1 illustrates the UAV 62B tethered to the vehicle 70. Referring now to FIG. 3, the ground vehicle 70 is illustrated as a pickup truck. However, it is contemplated that any other type of vehicle, e.g., van, car, etc. may be used as the vehicle to which the UAV 62B is tethered. It is contemplated that a tether 72 may provide a hard-contact point to constrain the movement of the UAV 62B. The tether 72 may include various cables that may be configured to provide power and communication, as well as a cable that is configured to constrain the movement of the UAV 62B.

The vehicle 70 may be equipped with a protected and heated enclosure 74 to store the UAV 62B between inspections. It is contemplated that the enclosure 74 may contain a power station 76 providing electrical power, e.g., DC power, to the tethered UAV 62B or to charge UAV 62A that is not tethered to the vehicle 70. The enclosure 74 may contain a heating element (not shown) to maintain the proper storage temperature of the UAV 62A, 62B and to melt any snow or ice that may have accumulated during the previous inspection. The enclosure 74 may also contain a UAV control module 100 (FIG. 3). The UAV 62A, 62B may be programmed for autonomous flight and controlled by the UAV control module 100, or by an operator in the vehicle 70.

Referring to FIG. 4, the control module 100 can include various systems and subsystems. The module 100 can be a personal computer, a laptop computer, a workstation, a computer system, an appliance, an application-specific integrated circuit (ASIC), a server, a server blade center, a server farm, etc.

The module 100 can include a processing unit 104, memory devices 108 and 110, a communication interface 112 (e.g., a network interface), a display 116 (e.g., a video screen), and an input device 118 (e.g., a keyboard and/or a mouse). The memory devices 108 and 110, such as a hard disk drive, server, stand-alone database, or other non-volatile memory, can also be in communication with the processing unit 104

The processing unit 104 can be a computing device. The processing unit 104 executes a set of instructions to implement the operations of examples disclosed herein. The processing unit can include a processing core.

The additional memory devices 108 and 110 can store data, programs, instructions, database queries in text or compiled form, and any other information that can be needed to operate a computer. The memories 108 and 110 can be implemented as computer-readable media (integrated or removable) such as a memory card, disk drive, compact disk (CD), or server accessible over a network. In certain examples, the memories 108 and 110 can comprise text, images, video, and/or audio, portions of which can be available in formats comprehensible to human beings. Additionally or alternatively, the control module 100 can access an external data source or query source through the communication interface 112. As illustrated in FIG. 1, the control module 100 may communicate via the communication link 114 to the remote location 20 (FIG. 1).

The control module 100 may be configured to receive images of the surface 10$a$ from the cameras 66. As noted above, the cameras 66 may be a high-resolution visible light (VIS) camera 66$a$, a short-wave infrared (SWIR) camera 66$b$, or other night vision cameras. The images obtained by the VIS and SWIR cameras 66$a$, 66$b$ may be transferred to the control module 100. As described above, certain wavelengths in the SWIR range are absorbed by ice or other contaminates on the surface 10$a$ and thus will be missing in reflected light. Thus, when the reflected light is captured by the SWIR camera 66$b$, the resulting image will be significantly different from a dry or wet surface 10$a$.

In addition to using the signals from the SWIR camera 66$b$, the control module 100 may be programmed to receive images from the visible light (VIS) camera 66$a$. The control module 100 may be programmed to use images provided by the VIS camera 66$a$ to detect ice or other contaminates on the surface 10$a$. The appearance of contaminates on the aircraft surface varies by contaminate, and can be detected in most cases by the VIS camera 66$a$. For example, a mat finish can be more indicative of ice on the surface 10$a$ as compared to a shiny metallic appearance that would be more indicative of the surface 10$a$ being dry or wet.

The control module 100 may then be programmed to superimpose the images from the SWIR camera 66$b$ and the VIS camera 66$a$ on an image of the aircraft 10. Locations where both the SWIR camera 66$b$ and the VIS camera 66$a$ indicate ice, other contaminates or fluid failure is present may be flagged to the operator.

It is contemplated that the control module 100 may include a convolution neural network (CNN) that is trained to recognize contaminates or fluid failure on the surface 10$a$ using the SWIR camera 66$b$ and the VIS camera 66$a$. The CNN may be designed to handle the unique features of the SWIR and VIS camera images of the surface 10$a$, including differences in texture, color, and reflectivity. The use of both cameras 66$a$, 66$b$ allows the CNN to capture more information about the surface 10$a$ and make more accurate classifications. Additionally, the architecture of the CNN may be optimized for the available computing resources and may be configured to make predictions in real-time.

The CNN may include several convolutional layers, max-pooling layers, and fully connected layers. The input to the CNN is a pair of images, one from the visual camera 66$a$ and the other from the SWIR camera 66$b$. The output may identify the specific contaminates or may be a binary classification of whether the corresponding area on the surface 10$a$ is covered with contaminates or not. The architecture of the CNN is designed to identify the subtle differences between images of a contaminated surface 10$a$ and a dry or wet surface 10$a$.

Figure 5:
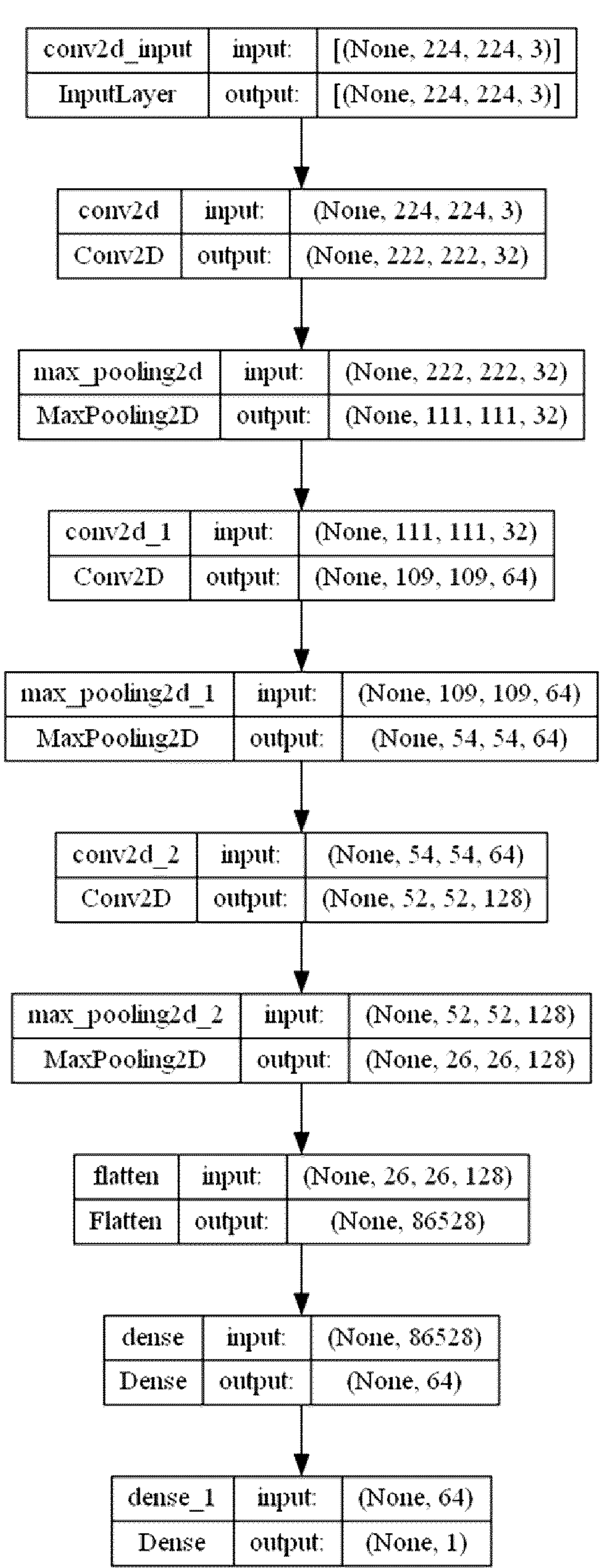
FIG. 5 is a schematic illustration of an architecture of a convolution neural network (CNN) for the system of FIG. 1.

The architecture is shown in FIG. 5. The CNN starts with a series of convolutional layers, which apply a set of filters to the input images. The filters in the early layers detect simple features such as edges and corners, while the filters in the later layers detect more complex features such as shapes and textures. The output of the convolutional layers is then passed through max-pooling layers, which reduce the size of the feature maps and help to prevent overfitting.

The output of the max-pooling layers is then passed through fully connected layers, which produce the final classification of ice-covered or dry. The fully connected layers are designed to combine the features learned by the convolutional and max-pooling layers into a single feature vector, which is then used to make the final classification.

It is contemplated that the control module 100 may also be configured to create a geofence (not shown), i.e., a boundary, around the aircraft 10 so that the UAV 62A, 62B does not fly directly over the aircraft 10 at any time. This boundary serves to protect the aircraft 10 should the UAV 62A, 62B experience a power failure or sudden loss of altitude. The geofence may be configured to represent the largest aircraft 10 that may be inspected, or unique geofences may be defined for each aircraft model or class that departs from an airport. It is also contemplated that the geofence for the aircraft 10 may be generated by flying the UAV 62A, 62B around the aircraft 10 at a safe distance and then detecting an outer boundary of the aircraft 10. The control module 100 may then determine the geofence by adding a predetermined safe zone around the outer boundary of the aircraft 10.

It is also contemplated that the control module 100 may be configured to define a specific flight path around the aircraft 10 to ensure that all critical surfaces 10*a* and aircraft elements are visible to the cameras 66. Similar to the geofence, the flight path may be generic for all aircraft models or customized by aircraft model/class or uniquely generated for each aircraft 10.

In addition to the obstacle avoidance sensors 64*b* (discussed in detail above), it is also contemplated that the UAV 62A, 62B may be equipped with additional safety measures to ensure that that the UAV 62A, 62B always maintains a safe distance from the aircraft 10. Measures may include equipping the UAV 62A, 62B with redundant motors and batteries. These redundant motors and batteries may allow the UAV 62A, 62B to remain in the air should the UAV 62A, 62B experience a failure of one of its primary motors, batteries or propellers during flight. The UAV 62, 62B may also be programmed to return to a base location, e.g., the enclosure 74, in the event of failure of any of the redundant components for a further level of safety. It is also contemplated that the UAV 62A, 62B may be configured to maintain its spatial position during high winds by relying on the sensors 64 that provide location data.

Referring now to FIG. 1, prior to inspection, the vehicle 70 would be positioned to the side of the aircraft 10 to be inspected. The operator would then interface with the control module 100 via the input device 118 to initiate the inspection of the aircraft. It is contemplated that the control module 100 may be programmed such that a remote system may interface with the control module 100 via the communication interface 112 to trigger the inspection. It is further contemplated that an additional optical sensor mounted on ground vehicle 70 may detect when the aircraft 10 is in position for inspection and trigger the launch of the UAV 62A, 62B. Alternatively, an operator may observe when the aircraft 10 is in position and manually initiate launch of the UAV 62A, 62B.

Once the UAV 62A, 62B has been launched, the control module 100 may activate the appropriate sensors 64 to start the inspection. However, if the light conditions are undesirable or the weather conditions would prevent safe flying of the UAV 62A, 62B, the control module 100 may cancel the request and enter an apology. The light sensors and/or other environmental sensors may be utilized to enable selection of the correct cameras 66 for the conditions.

During the inspection, it is contemplated that the UAV 62A, 62B would traverse a path that allows it to capture images of the critical surfaces 10*a* of the aircraft 10, which may include wings, control surfaces, rotors, propellers, upper surface of the fuselage on aircraft that have rear-mounted engines, horizontal stabilizers, vertical stabilizers, or any other stabilizing surface of an aircraft. These surfaces are deemed critical because any build-up of ice or other contaminate (such as frost, snow slush etc) can have a significant impact on the aircraft's ability to fly safely.

It is also contemplated that the UAV's 62A, 62B path may allow it to capture images of the opening of the engine 12, as well as the pitot tubes 13, since these are prone to ice buildup that can be difficult to fully clear during de-icing.

The images recorded during inspection are stored in the memory devices 108, 110 of the control module 100. Once the inspection is complete, the operator would transmit, as an example, one or all, pictures of the in-situ conditions of the critical surfaces 10*a* to the pilot, dispatcher and/or other stakeholders.

In one embodiment, the images may be transmitted directly to the pilot-in-command or other stakeholders via the communication interface. In this case the pilot-in-command or other stakeholders would assess the condition of the critical surfaces 10*a* directly from the high-resolution image, enabling them to see all of the critical surfaces 10*a* in greater detail than they could otherwise.

It is contemplated that the control module 100 may segment the aircraft 10 into a plurality of segments or areas. The control module 100 would then analyze each segment or area separately to detect critical surfaces 10*a*. The control module 100 may be programmed to alert the operator which segment or area needs further inspection.

Figure 6:
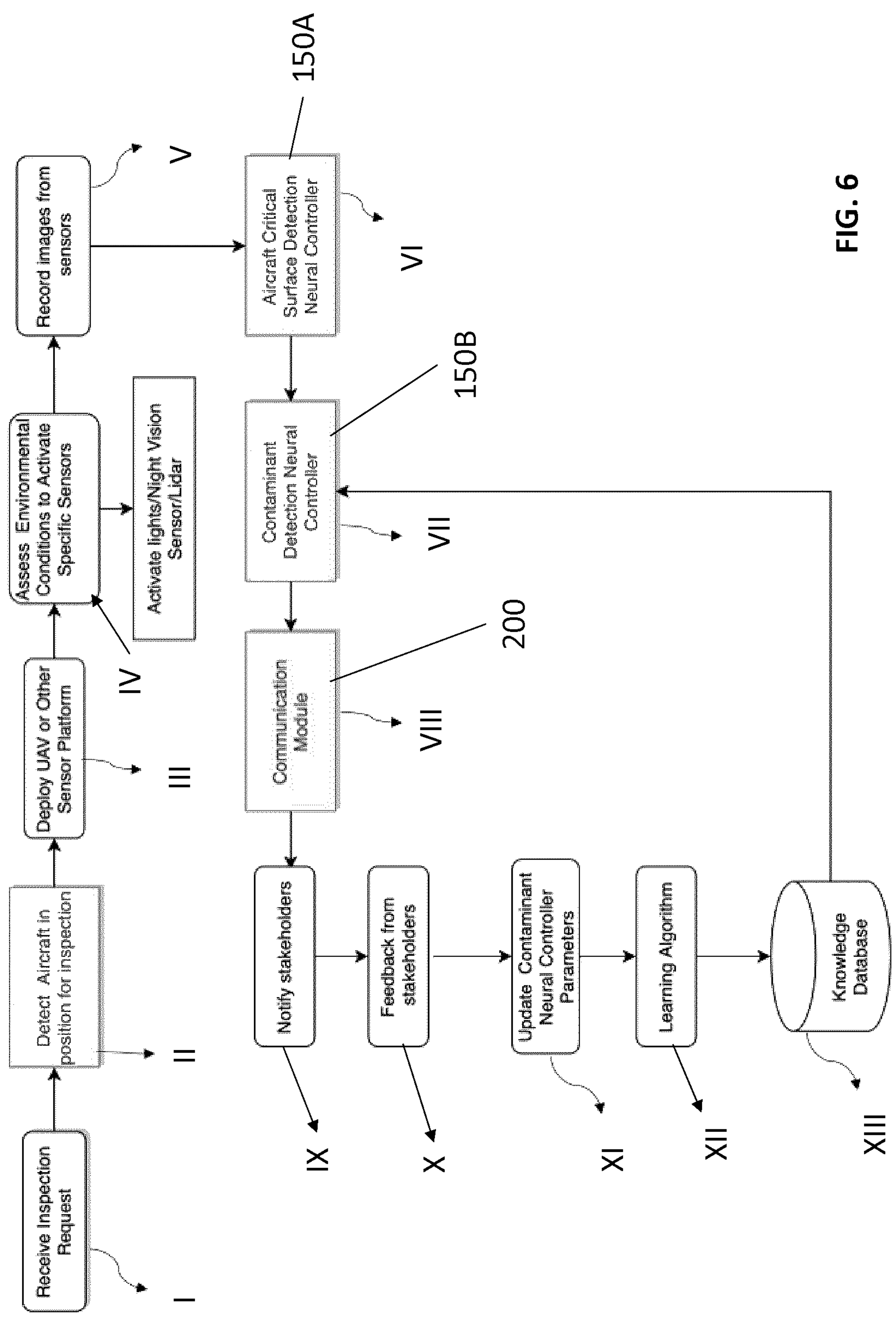
FIG. 6 is a flow chart illustrating an operating strategy for the inspection system of FIG. 1.

Referring to FIG. 6, the process of analyzing the aircraft 10 via the control module 100 and the storing of the data for future use is schematically illustrated. As described in detail above, objective assessment is accomplished by way of controlled illumination and electro-optical (EO) data acquisition. The data acquired is spatial (imaging), and spectral in nature. Furthermore, interpretation of the data may be via the CNN, as opposed to human interpretation of the acquired data. The CNN provides the following advantages over contemporary human perception and interpretation:

1) Sensitivity: EO sensors and relevant conditions yield more consistent, and higher sensitivity to the optical signals being detected than human vision.
2) Resolution: Optical system design for specific EO sensors provides ability to achieve higher spatial resolution than that achievable by human vision.
3) AI algorithms make possible versatility concurrent with repeatability and objectivity in data assessment.

Referring back to FIG. 6, at Step I, an inspection request is received via the control module 100. At Step II, the presence of the aircraft 10 at a predetermined inspection location is confirmed. It is contemplated that this confirmation may be via an operator, sensors, or a combination of both. At Step III, the pre-takeoff inspection system 50 deploys the UAV 62A, 62B. During Step IV, the control module 100 receives input from the sensors 64 to determine the environment conditions, e.g., time of day, amount of sunlight, etc. and activates the appropriate cameras 66.

In Steps V and VI, the control module 100 records the images from the cameras 66 and determines which surfaces 10*a* are critical or should be flagged for further inspection. The control module 100 may include an aircraft critical surface detection neural controller 150A. The neural controller 150A may be used to detect the surfaces 10*a* of the aircraft 10 that are critical. In addition, the neural controller 150A may be configured to ignore surfaces in the images that are not relevant, e.g., background objects, the ground or equipment adjacent the aircraft 10. The cameras 66*a*, 66*b* on the UAV 62A, 62B pass the images/video feed to the neural controller 150A and the neural controller 150A identifies and separates the critical surfaces 10*a* of the aircraft 10 for further inspection. It is contemplated that the neural controller 150A may include trained AI models to detect and segment all the critical surfaces on any civilian aircraft type.

It is contemplated that the control module 100 may include a contaminate detection neural controller 150B (Step VII) that may be configured to generate alerts based on the surface condition. It is also contemplated that the contaminate detection neural controller 150B may pass images that illustrate the condition of the critical surfaces 10*a* of the aircraft 10 to the communication interface 112. The contaminate detection neural controller 150B may also generate a display for the pilot overlaying the surface 10*b* and notating areas with possible fluid failure or contaminant.

In Step VIII, the communication interface 112 of the control module 100 communicates to the relevant stakeholders (e.g., pilot, airport personnel) the status of the surfaces 10*a* on the aircraft 10. These alerts and/or images may be presented to the pilot-in-command, dispatch or other stakeholders. In Steps IX-XIII the stakeholders take the collected information, modify (if needed) and update the CNN (if utilized) to improve its ability to detect fluid failure. In Step XIII, the knowledge database is updated so that the control module 100 may be updated, as needed.

In the embodiment described above, the communication interface 112 of the control module 100 handles the communication. It is contemplated that a separate communication module 200 (FIG. 6) may reside at a remote storage location (e.g., in the "cloud" 22), and will receive images and other output from the control module 100 and transmit data wirelessly to the Pilot-in-command, and or a dispatcher or other stakeholders. It is also contemplated that the information in the cloud 22 may be transferred to a remote location 20 for further processing and/or storage.

It is contemplated that feedback from the pilot-in-charge/other stakeholders may be used to update the parameters of the contaminate detection neural controller 150B and in turn the algorithm of the neural controller 150B. In this way the neural controller 150B is configured to learn from past situations to improve its operation. It is contemplated that the neural controller 150B may be configured to update its parameters either automatically, or after review by a user with the appropriate training and knowledge to properly determine if the controller parameters should be updated. In this way, the user may act as a type of safeguard to prevent improper modification of the neural controller 150B.

It is also contemplated that the collected data may be stored in external databases. This data may be analyzed offline and used to update the parameters of the CNN and model when appropriate.

Figure 7:
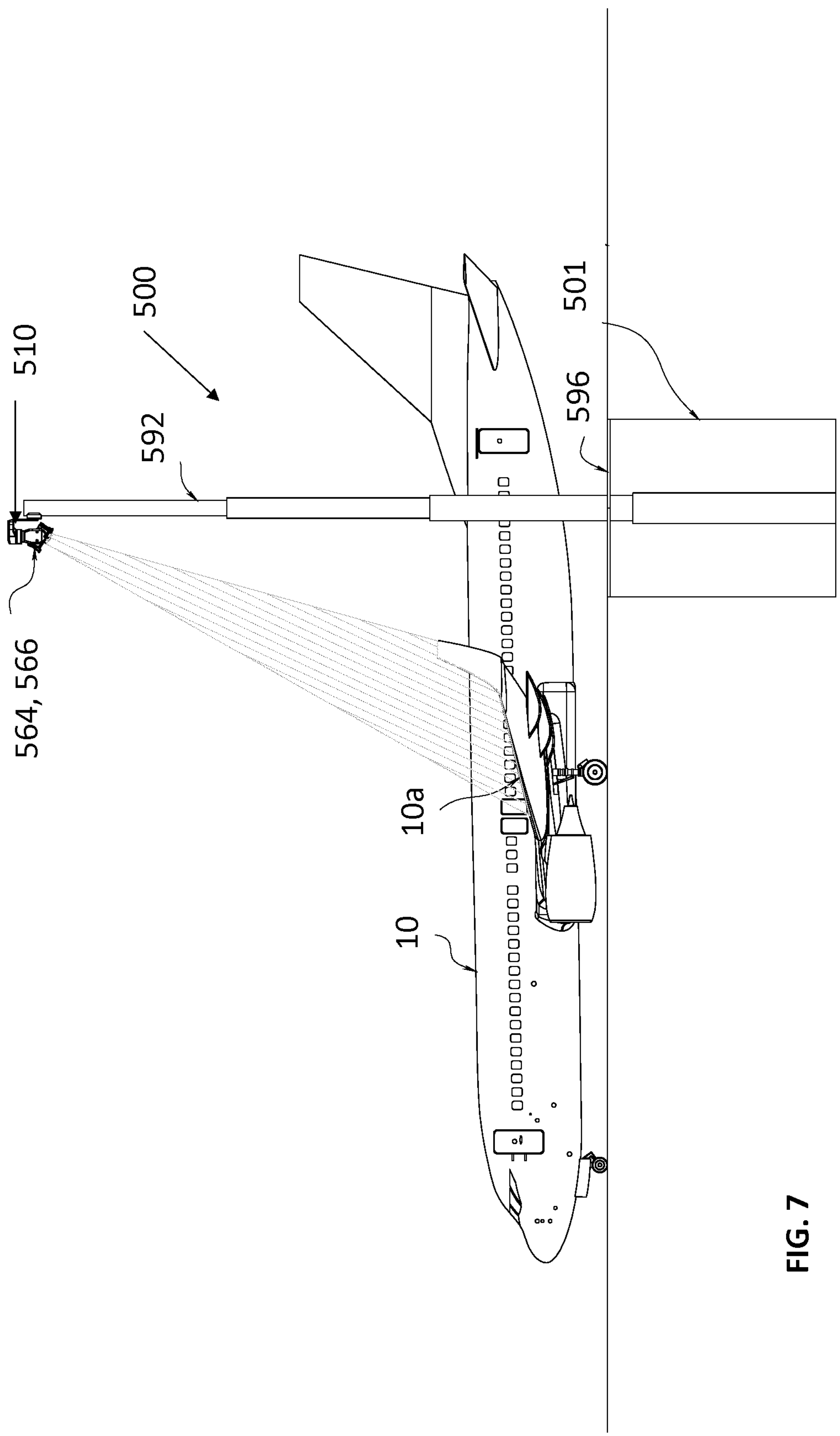
FIG. 7 illustrates an aircraft pre-takeoff inspection system according to another embodiment.

Referring to FIG. 7, in another embodiment, a pre-takeoff inspection system 500 may include sensors 564 and cameras 566. Sensors 564 are similar to sensors 64, discussed in detail above, and are not described herein for brevity. Similarly, cameras 566 are similar to cameras 66, discussed in detail above, and are not described herein for brevity. The function of the sensors 564 and cameras 566 are identical to the function of sensors 64 and cameras 66.

The sensors 564 and cameras 566 may be mounted onto a platform (not shown). The platform 510 may be installed on a movable gantry boom 592 that could be mounted to a ground vehicle (not shown), e.g., a truck, or mounted in an enclosure 501. The gantry boom 592 may be part of a system where the gantry boom 592 moves in a telescoping manner between a working/service position (FIG. 7) and a storage position. The enclosure 501 may be a type of 'missile silo' arrangement wherein the gantry boom 592, the platform 510, the sensors 564 and the cameras 566 are stored below an airfield surface 596 and emerge when in operation or being serviced. The platform 510 is mounted to a distal end of the boom 592 and can be deployed out of the "missile silo" type enclosure 501, below the airfield surface 596. When stowed, the system 500 can be serviced and/or kept heated at operating temperature. When in use, as seen in FIG. 7, the aircraft 10 is positioned such that the critical surfaces 10*a* can be viewed by the sensors 564 and cameras 566, as described in detail above for the sensors 64 and cameras 66.

In the embodiments described above, the control module 100 is positioned in the ground vehicle 70. It is contemplated that the control module 100 may be positioned remote from the ground vehicle 70 and all the data transmitted to the control module 100 for processing at that the remote location 20 (FIG. 1). It is also contemplated that a portion of the processing of the data transmitted by the sensors 64 and cameras 66 may be processed on the ground vehicle 70 with the remaining data being processed at the remote location 20.

It will be apparent to those skilled in the art that various modifications and variations can be made without departing from the spirit and scope of the claimed invention.

What we claim is:

1. A system for inspecting surfaces of an aircraft prior to takeoff, the system comprising:

a device movable relative to the surfaces of the aircraft;

a first camera on the device for determining conditions of the surfaces of the aircraft, the first camera being a short-wave infrared camera configured to detect light reflected from the surfaces of the aircraft that is in the short-wave infrared range and to provide a signal indicative of the light reflected from the surfaces;

a second camera on the device for determining conditions of the surfaces of the aircraft, the second camera being a visible light camera configured to detect variations in an appearance of the surfaces of the aircraft and to provide a signal indicative of the appearance of the surfaces; and a control module for receiving the signals from the first and second cameras, wherein the control module is configured to generate a composite image by overlaying the signals from the first and second cameras onto an image of the aircraft, the control module programmed to determine, based on the composite image, a status of the surfaces of the aircraft and to communicate that status to an external location.

2. The system of claim 1, wherein the status is provided via a text or image.

3. The system of claim 1, wherein the status is relayed to one or more of the following: a pilot-in-charge, a dispatcher or another stakeholder.

4. The system of claim 1, wherein the device is an unmanned aerial vehicle.

5. The system of claim 1, wherein the device is an unmanned aerial vehicle secured by a tether to a ground vehicle.

6. The system of claim 5, wherein the tether includes a plurality of cables for providing electrical power to the unmanned aerial vehicle and communication between the unmanned aerial vehicle and the ground vehicle.

7. The system of claim 5, further comprising an enclosure in the ground vehicle for storing the unmanned aerial vehicle.

8. The system of claim 7, wherein the control module is disposed in the enclosure.

9. The system of claim 1, wherein the device is attached to a moveable boom that is configured to move the device relative to the surfaces of the aircraft.

10. The system of claim 9, wherein the moveable boom is collapsible for storage below ground level.

11. The system of claim 1, the device further comprising a plurality of sensors, the plurality of sensors including one or more of the following: position sensors, obstacle avoidance sensors, light detection and ranging (LiDAR) sensors or light sensors.

12. The system of claim 1, wherein the control module includes a convolutional neural network.

13. The system of claim 1, wherein the control module is programmed to:

determine the presence or absence of a contaminate or a fluid failure on the surfaces based on the composite image; and provide an indication to an operator of the presence of the contaminate and/or fluid failure on the surfaces.

14. A system for inspecting surfaces of an aircraft prior to takeoff, the system comprising:

an unmanned aerial device movable relative to the surfaces of the aircraft wherein the unmanned aerial device moves at a distance spaced-apart from the surfaces of the aircraft;

a first camera on the device for determining conditions of the surfaces of the aircraft, the first camera being a short-wave infrared camera configured to detect light reflected from the surfaces of the aircraft that is in the short-wave infrared range and to provide a signal indicative of the light reflected from the surfaces;

a second camera on the device for determining conditions of the surfaces of the aircraft, the second camera being a visible light camera configured to detect variations in an appearance of the surfaces of the aircraft and to provide a signal indicative of the appearance of the surfaces; and a control module for receiving the signals from the first and second cameras, wherein the control module is configured to generate a composite image by overlaying the signals from the first and second cameras onto an image of the aircraft, the control module programmed to determine, based on the composite image a condition of the surfaces of the aircraft and to communicate that condition to an external location.

15. The system of claim 14, wherein the external location is a computer screen accessible to a pilot of the aircraft.

16. The system of claim 14, wherein the external location is a computer screen accessible to airport personnel remote from the aircraft.

17. The system of claim 14, wherein the control module includes a convolutional neural network configured to analyze the composite image to determine a presence or absence of a contaminate and/or fluid failure on critical surfaces of the aircraft.

18. The system of claim 14 wherein the control module includes an aircraft critical surface detection neural controller for detecting and isolating critical surfaces of the aircraft.

19. A method for inspecting surfaces of an aircraft prior to takeoff and determining a presence or absence of a contaminate and/or fluid failure on critical surfaces of the aircraft, the method comprising steps of:

successively positioning an unmanned aerial device adjacent a plurality of surfaces of the aircraft wherein the unmanned aerial device moves at a distance spaced-apart from the surfaces of the aircraft, the device comprising a first camera for determining conditions of the surfaces of the aircraft, the first camera being a short-wave infrared camera configured to detect light reflected from the surfaces of the aircraft that is in the short-wave infrared range and to provide a signal indicative of the light reflected from the surfaces and a second camera for determining conditions of the surfaces of the aircraft, the second camera being a visible light camera configured to detect variations in an appearance of the surfaces of the aircraft and to provide a signal indicative of the appearance of the surfaces;

segmenting the surfaces in images provided by the first and second cameras to determine critical surfaces of the aircraft;

generating composite images of the critical surfaces of the aircraft by overlaying the signals from the first and second cameras onto an image of the aircraft; and analyzing the composite images of the critical surfaces to determine the presence or absence of contaminates and/or fluid failure.

* * * * *